(12) United States Patent
McElrath et al.

(10) Patent No.: US 10,346,226 B2
(45) Date of Patent: Jul. 9, 2019

(54) METHODS AND APPARATUS FOR TRANSMITTING TIME SENSITIVE DATA OVER A TUNNELED BUS INTERFACE

(71) Applicant: Apple Inc., Cupertino, CA (US)

(72) Inventors: Jason McElrath, Cupertino, CA (US); Karan Sanghi, San Jose, CA (US); Saurabh Garg, San Jose, CA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/720,603

(22) Filed: Sep. 29, 2017

(65) Prior Publication Data

US 2019/0042525 A1 Feb. 7, 2019

Related U.S. Application Data

(60) Provisional application No. 62/542,194, filed on Aug. 7, 2017.

(51) Int. Cl.
*G06F 13/42* (2006.01)
*G06F 13/16* (2006.01)
(Continued)

(52) U.S. Cl.
CPC .............. *G06F 9/546* (2013.01); *G06F 9/466* (2013.01); *G06F 13/1673* (2013.01);
(Continued)

(58) Field of Classification Search
None
See application file for complete search history.

(56) References Cited

U.S. PATENT DOCUMENTS 4,805,137 A 2/1989 Grant et al.
4,987,529 A 1/1991 Craft et al.
(Continued)

FOREIGN PATENT DOCUMENTS

EP 3013008 A1 4/2016
JP 2004086792 A 3/2004
(Continued)

OTHER PUBLICATIONS

ECN L1 PM Substates with CLKREQ approved Aug. 23, 2012.
(Continued)

*Primary Examiner* — Michael Sun
(74) *Attorney, Agent, or Firm* — Gazdzinski & Associates, PC (57) ABSTRACT

Methods and apparatus for time sensitive data transfer between logical domains. In one embodiment, an user equipment (UE) device has an application processor (AP) coupled to a baseband processor (BB) that operate independently of one another normally, but may cooperate in limited hybrid use scenarios. For example, the BB receives audio packets via a cellular network that are converted to pulse code modulated (PCM) digital audio to be played by the AP. Unfortunately, since the AP and the BB are independently clocked, they will experience some clock drift. As a result, the audio playback may have undesirable artifacts if the drift is not otherwise compensated for. To these ends, the AP and/or BB determine a relative clock drift and compensate for playback by e.g., adding, padding, or deleting audio samples and/or audio packets. Techniques for handover scenarios are also disclosed.

20 Claims, 6 Drawing Sheets

(51) Int. Cl.
*G06F 9/46* (2006.01)
*G06F 9/54* (2006.01)
*G06F 13/362* (2006.01)
*H04W 84/04* (2009.01)
*H04W 72/12* (2009.01)

(52) U.S. Cl.
CPC ...... *G06F 13/3625* (2013.01); *G06F 13/4291* (2013.01); *H04W 72/12* (2013.01); *H04W 84/042* (2013.01)

(56) References Cited

U.S. PATENT DOCUMENTS

| | | | |
|---|---|---|---|
| 5,367,688 A | 11/1994 | Croll | |
| 5,467,459 A | 11/1995 | Alexander et al. | |
| 5,485,578 A | 1/1996 | Sweazey | |
| 5,613,086 A | 3/1997 | Frey et al. | |
| 5,659,542 A | 8/1997 | Bell et al. | |
| 5,708,779 A | 1/1998 | Graziano et al. | |
| 5,731,973 A | 3/1998 | Takaishi et al. | |
| 5,850,395 A | 12/1998 | Hauser et al. | |
| 5,903,564 A | 5/1999 | Ganmukhi et al. | |
| 5,943,507 A | 8/1999 | Cornish et al. | |
| 6,233,702 B1 | 5/2001 | Horst et al. | |
| 6,260,152 B1 * | 7/2001 | Cole ...................... G06F 1/12 | 713/375 |
| 6,359,863 B1 | 3/2002 | Varma et al. | |
| 6,411,997 B1 | 6/2002 | Dawes et al. | |
| 6,434,633 B1 | 8/2002 | Braun et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,735,642 B2 | 5/2004 | Kagan et al. | |
| 6,947,442 B1 | 9/2005 | Sato et al. | |
| 6,948,094 B2 | 9/2005 | Schultz et al. | |
| 6,990,594 B2 * | 1/2006 | Kim ...................... G06F 1/3203 | 713/322 |
| 7,100,020 B1 | 8/2006 | Brightman et al. | |
| 7,127,600 B2 | 10/2006 | Zimmer et al. | |
| 7,191,240 B1 | 3/2007 | Johnson | |
| 7,281,172 B2 | 10/2007 | Chujo | |
| 7,397,774 B1 | 7/2008 | Holland et al. | |
| 7,398,382 B2 | 7/2008 | Rothman et al. | |
| 7,509,391 B1 | 3/2009 | Chauvel et al. | |
| 7,681,012 B2 | 3/2010 | Verm et al. | |
| 7,685,476 B2 | 3/2010 | Andre et al. | |
| 7,802,256 B2 * | 9/2010 | Havens ................ G06F 9/4887 | 718/100 |
| 7,853,731 B1 | 12/2010 | Zeng | |
| 7,899,941 B2 | 3/2011 | Hendry et al. | |
| 7,941,682 B2 | 5/2011 | Adams | |
| 8,255,725 B2 | 8/2012 | Shimazaki et al. | |
| 8,352,624 B2 | 1/2013 | Zimmerman et al. | |
| 8,422,404 B2 | 4/2013 | Taki | |
| 8,468,285 B2 | 6/2013 | Kobayashi | |
| 8,635,412 B1 | 1/2014 | Wilshire | |
| 8,656,228 B2 | 2/2014 | Check et al. | |
| 8,788,822 B1 | 7/2014 | Riddle | |
| 8,799,537 B1 | 8/2014 | Zhu et al. | |
| 8,808,091 B2 | 8/2014 | Shaw et al. | |
| 8,819,386 B1 | 8/2014 | Mather | |
| 8,832,331 B2 | 9/2014 | Co | |
| 8,848,809 B2 | 9/2014 | Whitby-Strevens | |
| 9,170,957 B2 | 10/2015 | Touzni et al. | |
| 9,280,360 B2 | 3/2016 | Xu et al. | |
| 9,319,090 B2 | 4/2016 | Whitby-Strevens | |
| 9,544,069 B2 | 1/2017 | Whitby-Strevens et al. | |
| 9,547,535 B1 | 1/2017 | Wilt | |
| 9,769,756 B1 | 9/2017 | Cui et al. | |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 2002/0013868 A1 | 1/2002 | West | |
| 2002/0044553 A1 | 4/2002 | Chakravorty | |
| 2002/0065867 A1 | 5/2002 | Chauvel | |
| 2002/0169938 A1 | 11/2002 | Scott et al. | |
| 2003/0014607 A1 | 1/2003 | Slavin et al. | |
| 2003/0086122 A1 | 5/2003 | Parry | |
| 2003/0200413 A1 | 10/2003 | Gurumoorthy et al. | |
| 2004/0044929 A1 | 3/2004 | Chujo | |
| 2004/0064589 A1 | 4/2004 | Boucher et al. | |
| 2004/0128568 A1 | 7/2004 | O'Shea | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2005/0076196 A1 | 4/2005 | Zimmer et al. | |
| 2005/0108385 A1 | 5/2005 | Wechter et al. | |
| 2005/0114620 A1 | 5/2005 | Justen | |
| 2005/0117601 A1 | 6/2005 | Anderson et al. | |
| 2005/0149711 A1 | 7/2005 | Zimmer et al. | |
| 2005/0157781 A1 | 7/2005 | Ho et al. | |
| 2005/0285862 A1 | 12/2005 | Noda et al. | |
| 2006/0047989 A1 * | 3/2006 | Delgado .................. G06F 1/12 | 713/375 |
| 2006/0107071 A1 | 5/2006 | Girish et al. | |
| 2006/0218301 A1 | 9/2006 | O'Toole et al. | |
| 2007/0005869 A1 | 1/2007 | Balraj et al. | |
| 2007/0043901 A1 | 2/2007 | Wu et al. | |
| 2007/0070997 A1 | 3/2007 | Weitz et al. | |
| 2007/0180041 A1 | 8/2007 | Suzuoki | |
| 2007/0201492 A1 | 8/2007 | Kobayashi | |
| 2007/0226417 A1 | 9/2007 | Davis | |
| 2007/0286246 A1 | 12/2007 | Kobayashi et al. | |
| 2008/0010563 A1 | 1/2008 | Nishimura | |
| 2008/0046689 A1 | 2/2008 | Chen et al. | |
| 2008/0077816 A1 | 3/2008 | Ravichandran | |
| 2008/0183931 A1 | 7/2008 | Verm et al. | |
| 2008/0231711 A1 | 9/2008 | Glen et al. | |
| 2008/0235355 A1 | 9/2008 | Spanier et al. | |
| 2008/0244259 A1 | 10/2008 | Zimmer et al. | |
| 2008/0301148 A1 | 12/2008 | Lee et al. | |
| 2009/0024924 A1 | 1/2009 | Kim | |
| 2009/0113141 A1 | 4/2009 | Bullman et al. | |
| 2009/0138650 A1 | 5/2009 | Lin et al. | |
| 2009/0177847 A1 | 7/2009 | Ceze et al. | |
| 2009/0189442 A1 | 7/2009 | Chi | |
| 2009/0225818 A1 * | 9/2009 | Dapper .................. G06F 17/14 | 375/222 |
| 2009/0282050 A1 | 11/2009 | Thomas et al. | |
| 2009/0282088 A1 | 11/2009 | Thomas et al. | |
| 2010/0017655 A1 | 1/2010 | Gooding et al. | |
| 2010/0030932 A1 | 2/2010 | Ergas et al. | |
| 2010/0082859 A1 | 4/2010 | Hendry et al. | |
| 2010/0098419 A1 | 4/2010 | Levy et al. | |
| 2010/0329319 A1 | 12/2010 | Dai et al. | |
| 2011/0029696 A1 | 2/2011 | Uehara | |
| 2011/0035575 A1 | 2/2011 | Kwon | |
| 2011/0052142 A1 | 3/2011 | Sultenfuss et al. | |
| 2011/0083002 A1 | 4/2011 | Albers et al. | |
| 2011/0219208 A1 | 9/2011 | Asaad et al. | |
| 2011/0242425 A1 | 10/2011 | Zeng | |
| 2011/0257983 A1 | 10/2011 | Rathonyi et al. | |
| 2011/0276710 A1 | 11/2011 | Mighani et al. | |
| 2011/0310296 A1 | 12/2011 | Lee et al. | |
| 2011/0320861 A1 | 12/2011 | Bayer et al. | |
| 2012/0017063 A1 | 1/2012 | Hummel et al. | |
| 2012/0084483 A1 | 4/2012 | Sanjive | |
| 2012/0084484 A1 | 4/2012 | Post et al. | |
| 2012/0102307 A1 | 4/2012 | Wong | |
| 2012/0124252 A1 | 5/2012 | Kayama et al. | |
| 2012/0159513 A1 | 6/2012 | Pakhunov et al. | |
| 2012/0224640 A1 | 9/2012 | Sole et al. | |
| 2012/0229076 A1 | 9/2012 | Zhu et al. | |
| 2012/0306553 A1 * | 12/2012 | Kim ...................... H03M 1/06 | 327/158 |
| 2013/0050216 A1 | 2/2013 | Whitby-Strevens et al. | |
| 2013/0057567 A1 | 3/2013 | Frank et al. | |
| 2013/0138840 A1 | 5/2013 | Kegel et al. | |
| 2013/0162911 A1 | 6/2013 | Glen | |
| 2013/0290947 A1 | 10/2013 | Li | |
| 2014/0033220 A1 | 1/2014 | Campbell et al. | |
| 2014/0122828 A1 | 5/2014 | Kagan et al. | |
| 2014/0173236 A1 | 6/2014 | Kegel | |
| 2014/0189057 A1 | 7/2014 | Sankoda et al. | |

(56) References Cited

U.S. PATENT DOCUMENTS

| | | |
|---|---|---|
| 2014/0211894 A1* | 7/2014 | Yang .................. H04L 25/40 375/354 |
| 2014/0244866 A1 | 8/2014 | Manula et al. |
| 2014/0247983 A1 | 9/2014 | Macinnis et al. |
| 2015/0036051 A1 | 2/2015 | Broberg et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1* | 5/2016 | Powell .................. H04W 56/00 370/338 |
| 2016/0224442 A1 | 8/2016 | Sanghi et al. |
| 2016/0269991 A1 | 9/2016 | Van et al. |
| 2016/0299860 A1 | 10/2016 | Harriman |
| 2016/0363955 A1* | 12/2016 | Stevens .................. G06F 1/12 |
| 2016/0364350 A1 | 12/2016 | Sanghi et al. |
| 2017/0108912 A1 | 4/2017 | Li et al. |
| 2017/0177222 A1 | 6/2017 | Singh et al. |
| 2017/0249098 A1 | 8/2017 | Petkov et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0225251 A1 | 8/2018 | Sthoeger et al. |
| 2018/0367460 A1 | 12/2018 | Gao et al. |

FOREIGN PATENT DOCUMENTS

| | | |
|---|---|---|
| JP | 2012108677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49, 86, 87, 712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

\* cited by examiner

METHODS AND APPARATUS FOR TRANSMITTING TIME SENSITIVE DATA OVER A TUNNELED BUS INTERFACE

PRIORITY

This application claims the benefit of priority to U.S. Provisional Patent Application Ser. No. 62/542,194, entitled "METHODS AND APPARATUS FOR TIME SENSITIVE DATA TRANSFER BETWEEN CLOCK DOMAINS," filed Aug. 7, 2017, the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronics devices, as well as networks thereof. More particularly, the disclosure is directed to methods and apparatus for transmitting time sensitive data over a tunneled bus interface. In one exemplary aspect, methods and apparatus are disclosed for transferring pulse code modulated (PCM) audio data over an inter-processor communications (IPC) link.

2. Description of Related Technology

Cellular networks provide wireless network connectivity via a network of physical "cell" areas. Each cell is serviced by a base station; a subscriber device connects to the base station via a wireless connection. As a cellular device moves between cells, its data connection can be "handed over" from one cell to another cell. In this manner, a cellular network enables service reception over a much larger geographic footprint than any single base station could provide alone.

Most cellular devices have an application processor (AP) and a modem (also commonly referred to as "baseband") processor (BB). Generally, the application processor is responsible for device-specific functions (e.g., execution of the operating system, and any local applications) whereas the modem manages the data connection to the cellular network.

Consumers demand compact designs which provide more functionality out of smaller form factors. To these ends, device manufacturers have aggressively sought to reduce component sizes. One technique is to reduce pin counts, minimize component footprints, and reduce signal routing real estate by removing legacy bus interfaces. In order to keep legacy functionality, the legacy data payloads can be encapsulated within much higher speed bus interfaces.

Recent devices (such as the iPhone®, manufactured by the Assignee hereof) use an inter-processor communication (IPC) link to provide high speed data transfer between the application processor (AP) and baseband processor (BB). The IPC link offers a plethora of advantages in addition to high speed data transfers; for example, the IPC link allows the AP and BB to decouple their operation from one another to e.g., reduce software complexity, minimize power consumption, simplify clock requirements, and the like. In other words, the application processor and modem may have e.g., different software code bases, different power domains, different clock domains, etc.

Older bus interfaces continue to support legacy functionality. For example, digital audio is provided via pulse code modulated (PCM) data that is communicated between the AP and BB via an Integrated Inter-IC Sound Bus (I2S) serial bus interface. I2S is an ideal candidate for "pruning" because the IPC has ample bandwidth to support the relatively low data rate of PCM data. Unfortunately, the I2S interface has specific timing requirements that cannot be met with existing implementations of the IPC. More directly, isolating the clock domains between the AP and BB presents significant challenges for the time sensitive nature of PCM data.

To these ends, solutions are needed to appropriately compensate for differences in e.g., clock domains between independently operable processors. More generally, improved methods and apparatus are needed for transmitting time sensitive data over a tunneled bus interface.

SUMMARY

The present disclosure satisfies the foregoing needs by providing, inter alia, systems, methods, and apparatus for transmitting time sensitive data over a tunneled bus interface.

In a first aspect, a method for time sensitive data transfer between clock domains is disclosed. In one embodiment, the method includes operating a first processor apparatus independently of a second processor apparatus, the first and second processor apparatus operating in independent clock domains; responsive to a time sensitive processor transaction: determining a time reference for the second processor apparatus; adjusting the time sensitive processor transaction for the time reference of the second processor apparatus at the first processor apparatus; providing the adjusted time sensitive processor transaction to the second processor apparatus from the first processor apparatus; and causing the second processor apparatus to perform the adjusted time sensitive processor transaction.

In a second aspect, a computerized apparatus is disclosed. In one embodiment, the computerized apparatus includes a user equipment apparatus having a host processing apparatus that is coupled with an endpoint (e.g., peripheral) processing apparatus via a physical bus interface. The physical bus interface may include a PCIe/IPC link. The computerized apparatus is configured to operate in accordance with the method for time sensitive data transfer between clock domains as described supra.

In a third aspect, an application processor apparatus is disclosed. In one embodiment, the application processor apparatus includes a root complex, a central processing unit, a main memory unit and memory. The application processor apparatus is configured to operate in accordance with the method for time sensitive data transfer between clock domains as described supra.

In a fourth aspect, an endpoint processor apparatus is disclosed. In one embodiment, the endpoint processor apparatus includes an endpoint, a central processing unit, a main memory unit and memory. The endpoint processor apparatus is configured to operate in accordance with the method for time sensitive data transfer between clock domains as described supra.

In a fifth aspect, a computer readable apparatus is disclosed. In one embodiment, the computer readable apparatus includes a storage medium having computer readable instructions stored thereon, the computer readable instructions when executed by a processor apparatus is configured to operate in accordance with the method for time sensitive data transfer between clock domains as described supra.

In a sixth aspect, computerized logic is disclosed. In one embodiment, the computerized logic is configured to operate in accordance with the method for time sensitive data transfer between clock domains as described supra.

In a seventh aspect, a method for transmitting time sensitive data over a tunneled bus interface is disclosed. In one exemplary embodiment, the method includes: operating a first processor apparatus independently of a second processor apparatus, where the first processor apparatus operates with a first time reference and the second processor apparatus operates with a second time reference. Responsive to a time sensitive hybrid processor transaction, the method: determines the second time reference for the second processor apparatus; adjusts the time sensitive hybrid processor transaction to compensate for a clock difference between the first time reference and the second time reference; and provides the adjusted time sensitive hybrid processor transaction to the second processor apparatus from the first processor apparatus via the tunneled bus interface.

In one variant, the time sensitive hybrid processor transaction includes: transacting a pulse code modulated (PCM) digital audio signal; and the adjusting of the time sensitive hybrid processor transaction includes adjusting the PCM digital audio signal for transmission by the second processor apparatus to a cellular network.

In another variant, adjusting of the PCM digital audio signal includes adding null PCM digital audio data. In some variants, the adjusting of the PCM digital audio signal includes deleting a portion of the PCM digital audio signal.

In a third variant, the determining of the time reference for the second processor apparatus includes receiving a wrap event of a circular buffer of audio data; and comparing the wrap event to an audio playback time associated with the circular buffer of audio data.

In a fourth variant, the time sensitive hybrid processor transaction includes transacting a pulse code modulated (PCM) digital audio signal generated from one or more audio packets received from a cellular network. In some cases, the method further includes calculating a difference in one or more timestamps associated with the one or more audio packets when a handover event occurs. In some such cases, this includes calculating a corrected audio playback time associated with the PCM digital audio signal generated from the one or more audio packets associated with the handover event. In one exemplary variant, the method pro-rates the determined second time reference by the corrected audio playback time.

A user equipment (UE) apparatus is disclosed. In one embodiment, the UE apparatus includes: an application processor apparatus coupled to a baseband processor apparatus; the application processor apparatus including a circular buffer configured to transact pulse code modulated (PCM) digital audio data with the baseband processor apparatus via a tunneled bus interface; where the baseband processor apparatus is configured to transact audio packets with a cellular network based on the PCM digital audio data; and a non-transitory computer readable medium including one or more instructions. In one exemplary embodiment, the instructions, when executed by the application processor apparatus, cause the application processor apparatus to: determine a first time reference for the baseband processor apparatus; determine a clock drift between the first time reference and a second time reference of the application processor apparatus; and adjust the PCM digital audio data to compensate for the clock drift.

In one variant, the circular buffer includes: an uplink buffer configured to store PCM digital audio data for transmission to the baseband processor apparatus; and a downlink buffer configured to store PCM digital audio data received from the baseband processor apparatus.

In a second variant, the circular buffer is further configured to generate a buffer wrap event; and the determination of the first time reference is based on the generated buffer wrap event. In a related variant, the baseband processor apparatus is further configured to generate a buffer wrap event; and the determination of the first time reference is based on the generated buffer wrap event.

In a third variant, the application processor apparatus is configured to playback the adjusted PCM digital audio data. In a related variant, the application processor apparatus can provide the adjusted PCM digital audio data to the baseband processor apparatus.

A user equipment (UE) apparatus is disclosed. In one embodiment, the UE apparatus includes: an application processor apparatus coupled to a baseband processor apparatus; the application processor apparatus including a circular buffer configured to transact pulse code modulated (PCM) digital audio data with the baseband processor apparatus via a tunneled bus interface; where the baseband processor apparatus is configured to transact audio packets with a cellular network based on the PCM digital audio data; and a non-transitory computer readable medium including one or more instructions. In one exemplary embodiment, the instructions, when executed by the baseband processor apparatus, cause the baseband processor apparatus to: determine a first time reference for the application processor apparatus; determine a clock drift between the first time reference and a second time reference of the baseband processor apparatus; and adjust the audio packets to compensate for the clock drift.

In one variant, the circular buffer is configured to transact PCM digital audio data with the baseband processor apparatus without the application processor apparatus control.

In a second variant, the baseband processor apparatus is configured to transmit the adjusted audio packets to the cellular network.

In a third variant, the baseband processor apparatus is configured to notify the application processor apparatus of a handover event. In one such variant, the adjusted audio packets are pro-rated according to the determined clock drift attributed to the handover event.

Other features and advantages of the present disclosure will immediately be recognized by persons of ordinary skill in the art with reference to the attached drawings and detailed description of exemplary embodiments as given below.

All Figures © Copyright 2017 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link, it will be recognized by those of ordinary skill that the present disclosure is not so limited. In fact, the various aspects of the disclosure are useful in any device or network of devices that is configured to transmit time sensitive data over a tunneled bus interface as is disclosed herein.

While the following embodiments describe specific implementations of e.g., dedicated address spaces, legacy support capabilities, and specific protocols, those of ordinary skill in the related arts will readily appreciate that those such descriptions are purely illustrative of the broader principles described herein.

Inter-Processor Communications Link

Bus techniques have evolved which are able to handle faster data rates and provide higher levels of data throughput. One such example bus is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for most portable consumer electronics applications. Additionally, PCIe connectivity is unable to accommodate scenarios where the "peripheral" processor is required to operate while the "host" processor is asleep or vice versa (as is common with e.g., cellular devices and portable media players).

Figure 1:
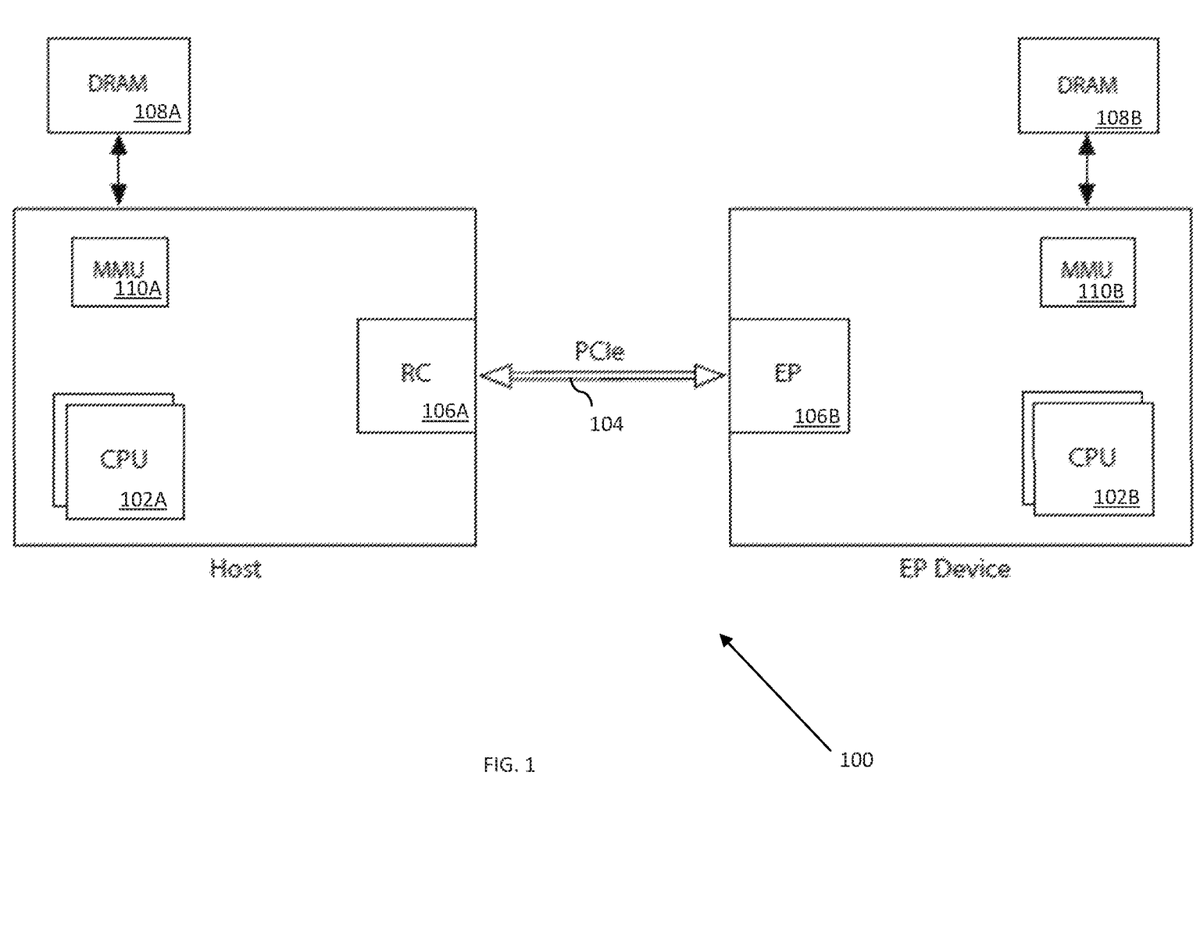
FIG. 1 is a logical block diagram of one exemplary apparatus useful for illustrating various principles described herein.

Current designs have modified PCIe for inter-processor communication (IPC) between two (or more) independently operable processors. For example, FIG. 1 illustrates one exemplary apparatus 100 useful for illustrating IPC operation. As shown, the apparatus 100 includes a first processor 102A and second processor 102B, and a physical bus interface 104 that is configured to implement an inter-processor communication (IPC) link between two (or more) independently operable processors.

Unlike extant PCIe connectivity, the exemplary IPC link 104 accommodates independent operation use scenarios where the "peripheral" processor is required to operate while e.g., the "host" processor is asleep, unavailable, and/or non-functional (and vice versa). Such operational scenarios and requirements are described in greater detail within e.g., commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015; and Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, each of the foregoing incorporated herein by reference in its entirety.

In one implementation, the first processor 102A includes an application processor (AP). As shown in FIG. 1, the first processor 102A is coupled to a Root Complex (RC) 106A which functions as the host of the IPC (e.g., PCIe) bus 104.

In one implementation, the second processor 102B includes a wireless modem. As shown in FIG. 1, the second processor 102B is coupled to an Endpoint (EP) 106B which functions as the peripheral of the IPC bus. Moreover, although not illustrated, it would be readily apparent to one of ordinary skill given the contents of the present disclosure that the disclosed apparatus 100 may include multiple first processors 102A and/or may include multiple second processors 102B, where each of these processors are communicatively coupled using e.g., multiple physical bus interfaces 104, the foregoing depiction in FIG. 1 merely being illustrative of the principles described herein.

As shown, both the first 102A and the second processors 102B are each coupled to a non-transitory computer readable medium (e.g., a respective dynamic random access memory (DRAM) 108A, 108B and a respective memory management unit (MMU) 110A, 110B). The non-transitory computer readable medium is configured to store computer readable instructions for execution by a processor apparatus (e.g., the first and/or second processors (102A, 102B)).

Figure 2:
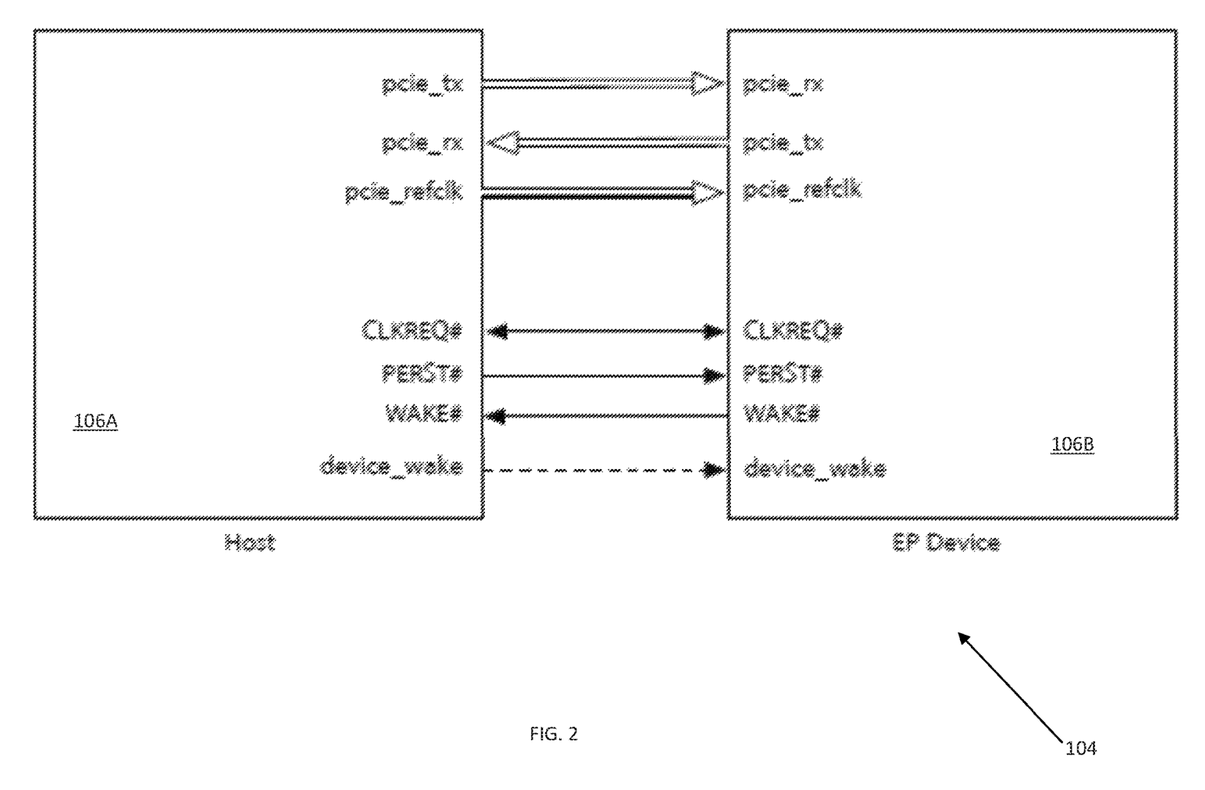
FIG. 2 is a logical block diagram of one exemplary physical bus interface useful in conjunction with the various principles described herein.

FIG. 2 illustrates the exemplary physical bus interface 104. The exemplary physical bus interface 104 can transact data based on a point-to-point communication channel between two IPC ports (e.g., the RC 106A and EP 106B). During data transactions, the first 102A and second processors 102B can send/receive access requests (configuration read/write, I/O read/write, memory read/write) and interrupts. The link (e.g., physical bus interface 104) is composed of one or more lanes (one shown in FIG. 2), each lane having receive and transmit component (pcie_rx, pci_tx). Each lane is a full-duplex byte stream, transporting data packets in eight-bit 'byte' formats, between the RC 106A and EP 106B of a link, in both directions simultaneously. The physical IPC link 104 can support multiple logical links (or virtual bus interfaces) representing multiple ongoing data sessions. See also e.g., co-owned U.S. patent application Ser. No. 14/856,283, filed Sep. 16, 2015 and entitled "METHODS AND APPARATUS FOR AGGREGATING PACKET TRANSFER OVER A VIRTUAL BUS INTERFACE", the contents of the foregoing incorporated herein by reference in its entirety.

Exemplary Pulse Code Modulation Over IPC Links—

Figure 3:
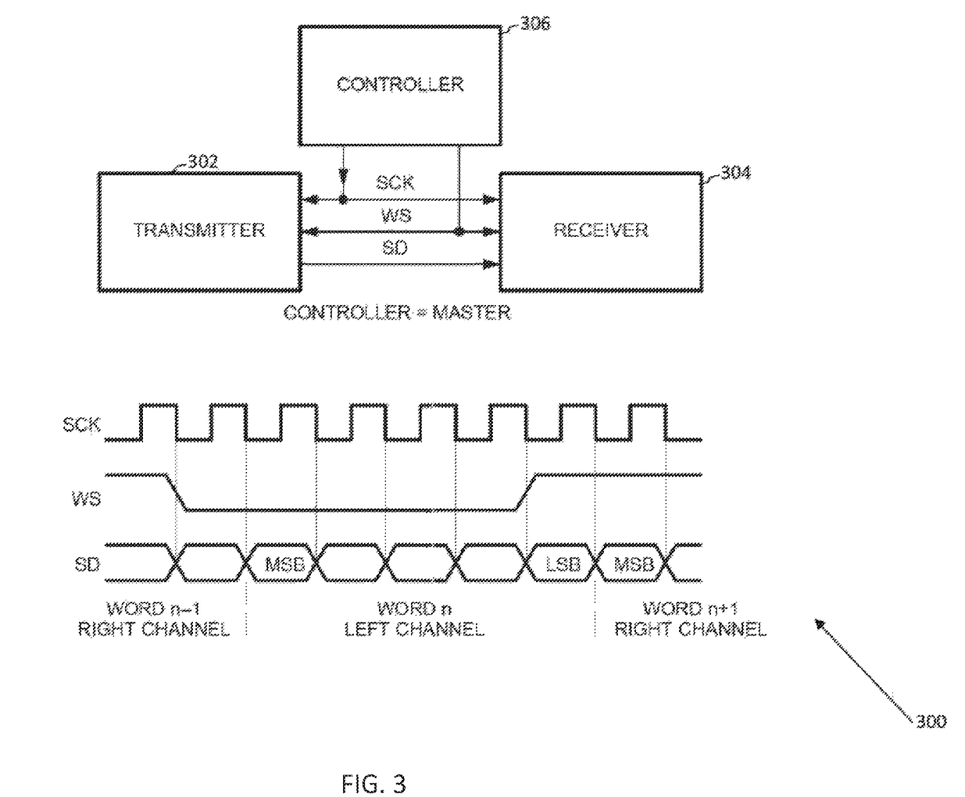
FIG. 3 is a graphical illustration of an Integrated Inter-IC Sound Bus (I2S) serial bus interface, and associated logical timing diagram.

FIG. 3 is a graphical illustration of an Integrated Inter-IC Sound Bus (I2S) serial bus interface. As shown the I2S interface minimally includes a transmitter 302 and a receiver 304. For simple point-to-point connections, the transmitter 304 is the "master" of the bus. For multi-point connections (e.g., where there may be multiple transmitters 302 and receivers 304), the bus may be mastered by any of the transmitter 302, receiver 304, or an entirely separate controller 306. During operation, the I2S master provides a clock (SCK) and word select (WS). The I2S transmitter generates data (SD). I2S operation is described in e.g., the I2S bus specification, originally published in February 1986 (later revised in June 1996), by Philips Semiconductors, the foregoing being incorporated herein by reference in its entirety.

The I2S interface was originally designed (and remains commonly used) for digital audio signaling. Real-time signaling imposes specific time constraints on data delivery. For example, any human perceptible media or interface (e.g., audio, visual, and/or human interface) generally should be handled faster than human perception to provide an acceptable user experience. Consequently, in most consumer device applications, the I2S interface is only dedicated for raw digital audio. Other examples of raw digital audio formats include e.g., pulse code modulated (PCM) data, linear PCM (LPCM), pulse density modulated (PDM) data, pulse width modulated (PWM) data, and/or other modulation formats. Raw digital audio formats can be further compressed for delivery via e.g., MPEG, WAV, AIFF, AIFF, VOB, and/or any number of other compressed audio data formats.

Existing devices (such as the iPhone® manufactured by the Assignee hereof) communicate PCM raw audio data between the application processor (AP) and baseband processor (BB) via an I2S interface. As previously alluded to, I2S is an ideal candidate for "pruning" because the IPC has ample bandwidth to support the relatively low data rate of PCM data. However, existing digital audio software and hardware assume that I2S data is provided with an accurate clock (SCK); in fact, the raw PCM data does not have any explicit time reference (the passage of time is solely indicated by SCK). Since the IPC isolates the AP from the BB and vice versa, neither the AP nor the BB have a reliable reference for the other processor's time base. Thus, even though the IPC link allows the AP to transmit and receive PCM data to and from the BB, if the BB consumes or generates the PCM data too quickly or too slowly, then the audio quality will be perceptibly diminished (e.g., the listener will hear "pops", "echoes", "clicks", and any number of other undesirable audio effects).

Figure 4:
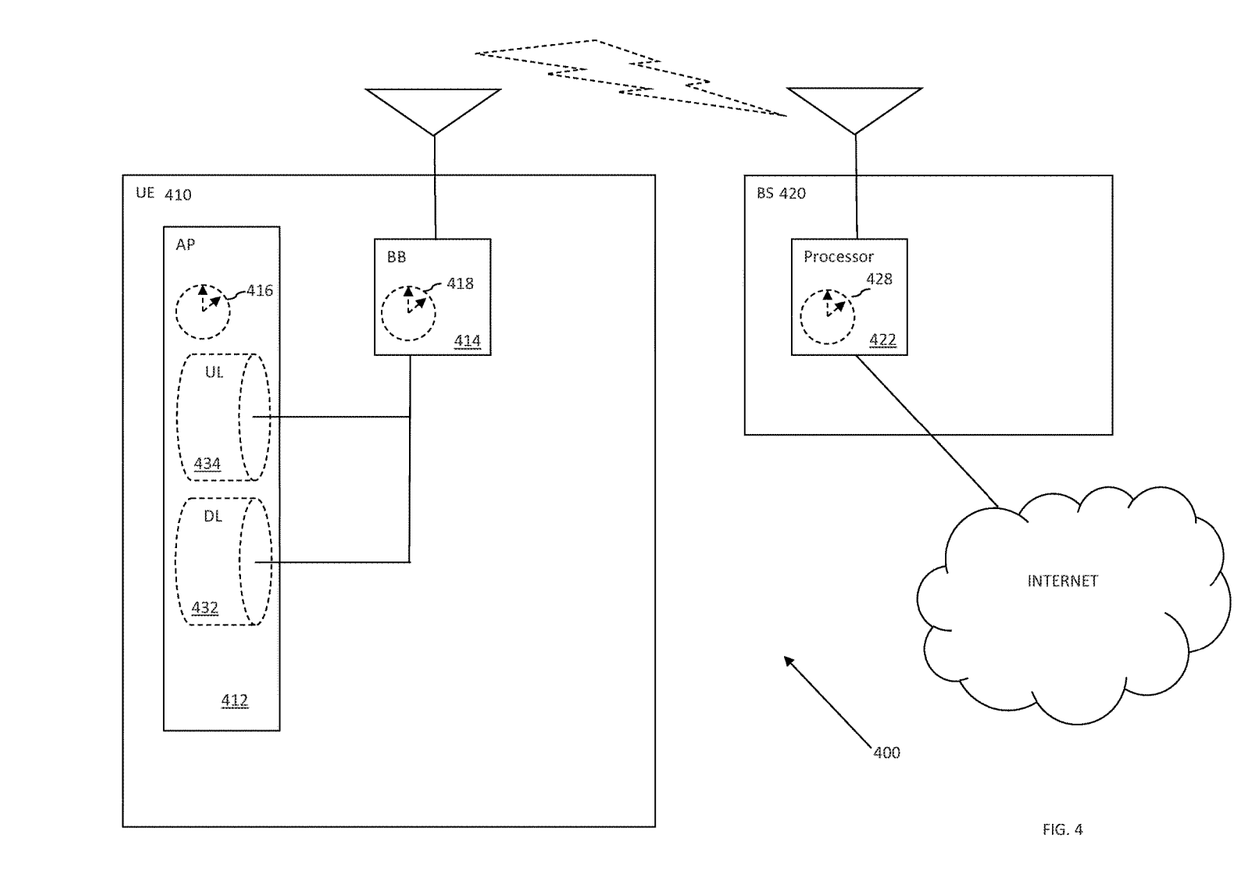
FIG. 4 is a logical block diagram of audio delivery within a cellular network, in accordance with the various principles described herein.

FIG. 4 illustrates one logical block diagram of audio delivery within a cellular network 400 in accordance with the principles of the present disclosure. As shown, a user equipment (UE) device 410 (e.g., a smart phone such as an iPhone® manufactured by the Assignee hereof) is in communication with a base station (BS) 420. The UE 410 includes an application processor (AP) 412, a modem baseband (BB) 414, and one or more antennas. The AP 412 and BB 414 each have independent and distinct clock domains 416, 418. The BS 420 also includes a processor 422. The BS 420 has yet another independent and distinct clock domain 428. The BS 420 may connect the UE 410 to other UE's or, for example, the broader Internet or other private internets.

In one exemplary embodiment, an isochronous IPC channel transmits audio pulse code modulated (PCM) data between an application processor (AP) and baseband modem (BB) over the IPC link. In order to guarantee isochronous delivery, traffic on the isochronous IPC channel is prioritized above data traffic on asynchronous data channels, and the exemplary isochronous IPC channel is prioritized over features that may introduce latency (including message signal interrupt (MSI) mitigation, doorbell mitigation, and other interrupt based signaling).

As a brief aside, "asynchronous" data delivery (also commonly termed "best effort" delivery) refers to data traffic that can be delivered at variable intervals; i.e., the data rate of the stream is not required to be constant. Asynchronous data delivery may be coupled with error detection and retransmission to ensure robust data delivery. "Synchronous" data delivery is transferred in sync with a clock signal; synchronous data provides a guaranteed bandwidth, but is inflexible. "Isochronous" data delivery combines aspects of synchronous and asynchronous delivery; a fixed amount of isochronous data must be delivered within a fixed time interval. However, in isochronous delivery schemes, the time of delivery can be flexibly scheduled within the fixed time interval.

Referring back to FIG. 4, the uplink and downlink audio channels are stored within two (2) circular buffers 432, 434 in the application processor memory (e.g., DRAM 108A). The uplink and downlink channels are unidirectional. Circular buffer 432 may correspond to an uplink audio channel, while circular buffer 434 may correspond to the downlink audio channel. "Uplink" refers to audio data that is captured at the subscriber device (e.g., UE 410) and sent to the network (e.g., BS 420) whereas "downlink" refers to audio data that is received from the network (e.g., BS 420) and played at the subscriber device (e.g., UE 410). In the illustrated embodiment, the circular buffers 432, 434 are sized according to the audio data traffic; for example, the PCM audio data is symmetrically sampled at 16 kHz, with each data packet holding 20 ms of data, and each circular buffer is appropriately sized to hold a buffer of 300 ms of audio data. In some implementations, the circular buffers 432, 434 may be symmetrically sized, while in other implementations, the circular buffers 432, 434 may be asymmetrically sized.

As previously alluded to, traffic on the isochronous IPC channel may be prioritized above data traffic on asynchronous data channels and/or any other features or operations that may introduce latency (including message signal interrupt (MSI) mitigation, doorbell mitigation, and other interrupt based signaling). In some implementations, the audio subsystem executing on the AP 412 has direct access to the circular buffers 432, 434 for the isochronous IPC channel (e.g., on physical bus interface 104) and transfers and receives the audio data without the AP's IPC software involvement and/or AP control (e.g., without IPC scheduling). In other words, when an audio data segment is received from the BB audio subsystem, it is immediately transferred over IPC into the uplink circular buffer 432 in AP memory without requiring the AP to schedule access to the memory. Similarly, when audio data is required by the BB audio subsystem, a segment is transferred over the physical bus interface 104 (e.g., PCIe/IPC) directly from the downlink circular buffer 434 in AP memory.

As a practical matter, each of the clock domains 416, 418, and 428 may have slightly different operating frequencies, and may drift over time relative to one another. The amount of drift experienced by each clock varies based on a variety of factors including e.g., manufacturing tolerances, differences in temperature, voltage, etc. Clock drift is empirically determined to be on the order of magnitude of about 20 parts per million (20 ppm) in some implementations. Accordingly, over the course of a single 300 ms buffer, the clock drift may be negligible. However, if the clocks are allowed to drift unchecked over a number of buffer lengths, the loss of synchronization may be significant.

In order to control for this drift, the BS clock domain 428 controls the cellular network time and the UE's corresponding BB clock domain 418 adjusts itself to BS clock domain 428 in order to correct for time difference due to frequency drift. Generally, the UE's AP clock domain 416 is independent and does not need to be synchronized to the cellular network time; the AP's clock domain 416 can freely drift relative to the BS clock domain 428 (and the BB clock domain 418.) However, in the context of isochronous applications such as the aforementioned digital audio applications, the UE's AP 412 must be aware of the cellular network time in order to correctly process audio data into audio samples (and/or convert audio samples into audio data). Consequently, various aspects of the present disclosure enable the UE's AP 412 to modify its clock domain 416 relative to the network time reference (e.g., either the BB clock domain 418, or the BS clock domain 428).

In some implementations, the BB 414 sends an IPC message to AP 412 containing the timestamp of a wrap event (e.g., a "wrap event" is when the producer or consumer of content, having reached the end of the memory region associated with the circular buffer, returns to and proceeds from the beginning of the memory region.) When, for example, the IPC driver receives the wrap event IPC message, it uses a time sync IPC mechanism to convert the event timestamp from the BB time domain 418, and provides the timestamp to the audio subsystem for clock drift compensation. In some implementations, the AP 412 internally determines the timestamp for when the circular buffers wrap. When a circular buffer wraps, the AP 412 calculates its current timestamp and provides the timestamp to the audio subsystem for clock drift compensation. Notably, while this example is based on circular buffer wraps, any synchronization events that occur at some predetermined interval could be substituted with equivalent success.

The audio subsystem continuously reads and writes PCM data to/from the pair of circular buffers 432, 434 in AP memory at a predetermined rate. Depending on the amount of clock drift between the AP clock domain 416 relative to the network time reference (e.g., either the BB clock domain 418, or the BS clock domain 428), the PCM data will be produced or consumed at a slightly faster or a slightly slower rate. Consequently, the audio subsystem can correct for clock drift by measuring the differences in timestamps of circular buffer wraps. For example, if the circular buffer contains 300 ms of audio data, and the AP timestamps for a circular buffer wrap are at 301 ms intervals, then the AP must slightly increase its clock frequency (to compensate for its slightly slower rate). Similarly, if the AP timestamps are at 299 ms intervals, the AP will compensate by decreasing its clock frequency.

Symmetric uplink and downlink buffers running at identical sample rates will wrap at the same rate. However, where either the buffers are asymmetrically sized (as discussed supra) or otherwise operating at asymmetric rates, the buffers will wrap differently resulting in more frequent corrections to drift rate (e.g., the frequency correction can be performed whenever either one of the uplink and downlink buffers wraps). Similarly, while the aforementioned embodiment is based on buffer wraps, more frequent correction events may be used (e.g., ¾ full, ½ full, ¼ full, etc.). Artisans of ordinary skill in the related arts will recognize, given the contents of the present disclosure, that more frequent corrections can be used to further smooth differences in clock drift.

Handover Timing Variant—

In the aforementioned embodiments, audio data may be of regular size and frequency (e.g., each audio packet holds 20 ms of 16 kHz sampled audio) such that the buffer depletion rates are static and by extension, clock drift correction can be directly inferred from buffer level and/or buffer wrap events. However, artisans of ordinary skill in the related arts will readily appreciate that certain circumstances may result in dropped packets, skipped packets or packets that are of irregular size or interval. For example, a data packet may be lost in the event of a handover from one base station to another base station. Additionally, transferring from one base station to another base station can result in a different network time reference (e.g., the clock domain 428 of one base station may differ from a clock domain of another base station).

Figure 5:
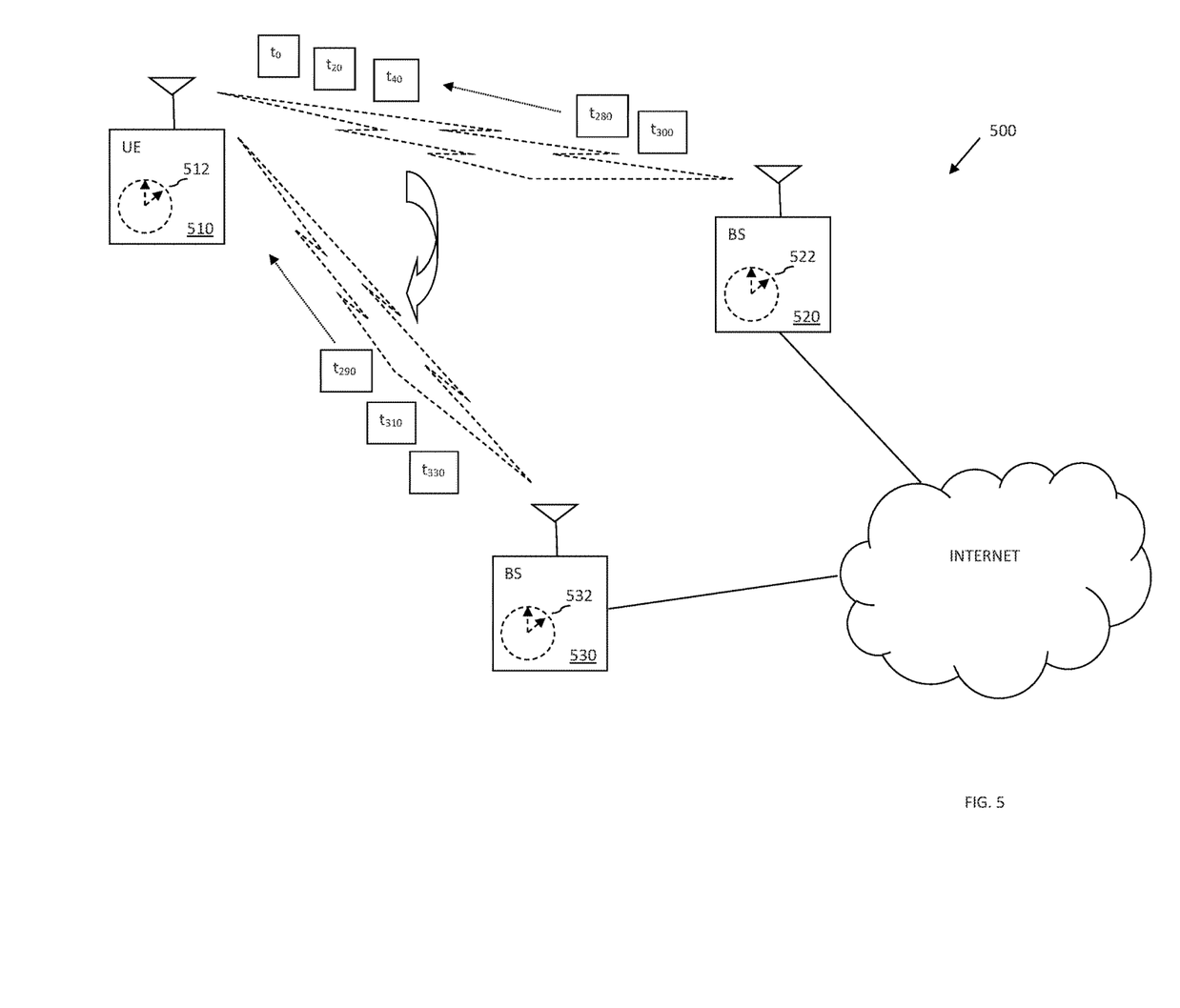
FIG. 5 is a logical block diagram of one exemplary handover scenario useful for illustrating a packet loss or degradation scenario.

FIG. 5 is a logical block diagram of one exemplary handover useful for illustrating a packet loss, degradation, or partial loss scenario. As shown, a UE 510 has an AP time reference 512 and is in communication with a first BS 520 with a time reference 522 (in this scenario, the UE's BB time reference is synchronized to its connected BS time reference). The communication includes an audio session having an audio packet stream that includes e.g., 16 kHz packets spaced at 20 ms intervals. As shown, the packets are timestamped at e.g., $t_0$, $t_{20}$, $t_{40}$ . . . $t_{280}$, $t_{300}$.

As the UE 510 moves out of range of the first BS 520, it is transferred to a second BS 530 with a time reference 532. However, BS 520 and BS 530 may have a difference in radio network timing between clock domain 522 and clock domain 532 that corresponds to, for example, a 10 ms in offset between the clock domains. Thus, the audio session audio packet stream may be timestamped at e.g., $t_{290}$, $t_{310}$, $t_{330}$, etc.

Since the handover event results in a substantial offset in timing, the BB notifies the AP of the handover event implicitly or explicitly. In an explicit notification, the BB directly indicates to the AP (via interrupt or other signaling) that a handover has occurred, and the timestamp at which the handover was performed. Implicit variants may communicate by e.g., writing more or less data than is expected. The AP may then infer the handover event from the audio data differences.

In order to reconcile the audio data differences between the two (2) packet streams, one exemplary embodiment of the BB drops packets and/or pads data to provide a continuous stream of valid audio data. Specifically, the downlink circular buffer 434 may be populated with timestamps $t_0$, $t_{20}$, $t_{40}$ . . . $t_{280}$. At the handover point, timestamp $t_{300}$ may be replaced with, for example, 10 ms of comfort noise, and the buffer may be transitioned to the second BS 530 audio stream with packets $t_{310}$, $t_{330}$. While the foregoing description may be colloquially referred to as a "drop and pad" approach, artisans of ordinary skill will readily appreciate that similar results may be obtained with a "drop and duplicate" approach (e.g., where timestamp $t_{300}$ is replaced with a duplicate of $t_{310}$), an overlap approach (e.g., where timestamp $t_{300}$ is followed by $t_{310}$) or any number of alternative schemes for data padding. Similarly, the AP may fill the uplink circular buffer 432 with a silent (or null) packet, a comfort noise packet, a duplicative packet, etc.

Additionally, in order to reconcile the clock drift between the two (2) packet streams, the wrap events may be pro-rated. As previously noted, the audio subsystem corrects for clock drift by measuring the difference in timestamps of circular buffer wraps that are expected to occur every, for example, 300 ms. Under a pro-rated variant, when a buffer wraps earlier or later (e.g., if timestamp $t_{300}$ is replaced by timestamp $t_{310}$) then the drift correction is adjusted by a pro-rated (fractional) amount to correct or compensate for the earlier or later wrap. In alternative embodiments, the wrap events at a handover transition may be completely ignored; such variants may only correct for clock drift based on a circular buffer wrap event that occurs from e.g., a single base station.

While the above discussion is cast in terms of specific timestamp examples and specifically sized audio data packets, it would be readily apparent to one of ordinary skill given the contents of the present disclosure that the aforementioned discussion is merely illustrative of the broader concepts disclosed herein.

Methods—

Figure 6:
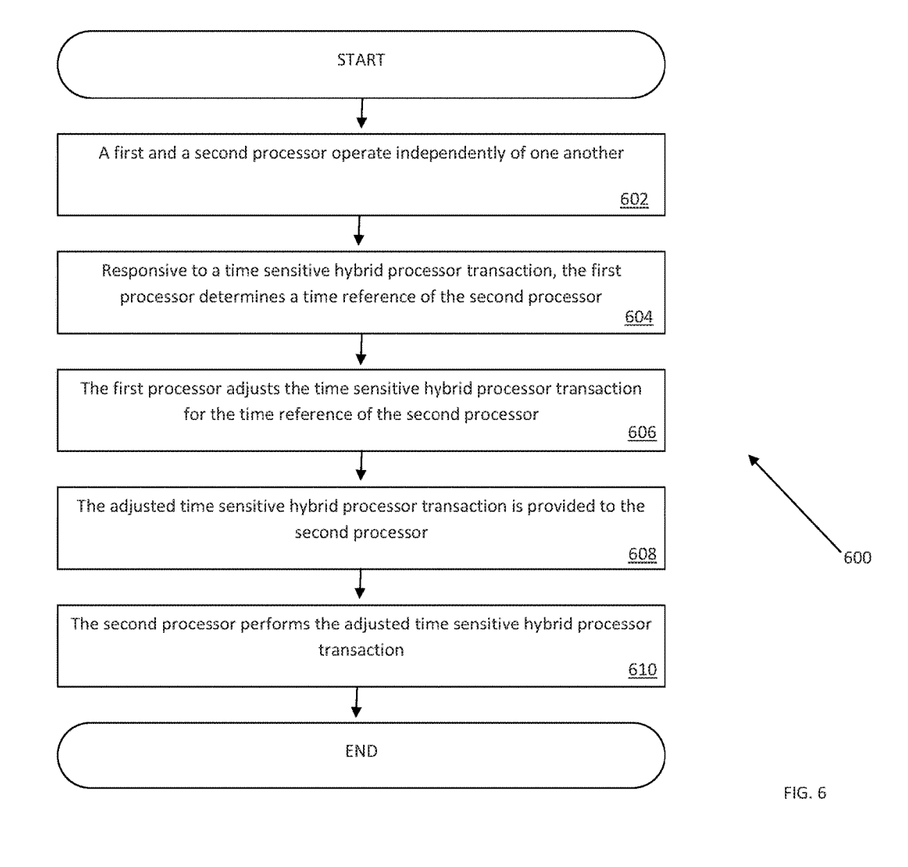
FIG. 6 is a logical flow diagram of one generalized method for transmitting time sensitive data over a tunneled bus interface.

FIG. 6 is a logical flow diagram of one generalized method 600 for transmitting time sensitive data over a tunneled bus interface.

At operation 602 of the method 600, a first and a second processor are operated independently of one another. As used herein, a "processor" refers generally to any logic or circuitry that responds to and processes computer-readable instructions that are stored within, for example, a computer-readable medium e.g., a memory. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power.

Common examples of processors include without limitation, application processors (AP), baseband processors (BB), media processors, network processors (e.g., network routers, gateways, hubs, and/or other network accelerators), hardware accelerators, graphics processors, digital signal processors (DSP), field programmable gate arrays (FPGA), application specific integrated circuits (ASIC), neural networks, artificial intelligence (AI) engines, security modules, and/or any other processing logic.

As a brief aside, so-called "application processors" are processors that are configured to execute an operating system (OS) and one or more applications, firmware, and/or software. The term "operating system" refers to software that controls and manages access to hardware. An OS commonly supports processing functions such as e.g., task scheduling, application execution, input and output management, memory management, security, and peripheral access. As used herein, the term "application" refers to software that can interact with the hardware only via procedures and interfaces offered by the OS.

A so-called "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band networks.)

As used herein, the term "independent" refers to a processor in a processing system having one or more of the processor clock domain, processor power domain, processor code base, arithmetic units, registers, and/or memory, isolated to allow the processor to operate without other processors in the processing system. In one exemplary embodiment, an independently operable processor can transition into various power-conserving modes independent of the power-conserving modes of other ones of the plurality of sub-systems. In another embodiment, an independently operable processor can adjust its clock frequency, phase, and/or amplitudes, independent of the power-conserving modes of other ones of the plurality of sub-systems. In still another embodiment, an independently operable processor can reboot and/or update its firmware or software independent of the software execution of other ones of the plurality of sub-systems.

While the present disclosure is primarily directed to processor based operations, artisans of ordinary skill in the related arts will readily appreciate that the various techniques described herein may be applied with equivalent success to any number of other logic and/or circuitries. Common examples of such logic include without limitation: memories, processors, arithmetic units, field programmable gate arrays, programmable logic devices, application specific integrated circuits, and/or any number of other semiconductor devices.

In one exemplary embodiment, the first and second processor are connected via a tunneled bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers.)

As used herein, the term "tunnel" and "tunneled" refers to encapsulating a first communications protocol within a second transport protocol, for transfer over a bus interface that supports the second transport protocol. Tunneling allows data communications between logical nodes using the first communications protocol, over an underlying bus technology that does not support the first communications protocol.

In one exemplary embodiment, an application processor (AP) and a baseband processor (BB) have a digital audio bus interface which is tunneled via an inter-processor communications (IPC) link. In one embodiment, both the AP and the BB send and receive digital audio data via a transceiver. For example, during a voice call, the BB receives the downlink digital audio which is provided to the AP for playback over the speaker. In the reverse direction, the subscriber's voice is received via a microphone of the AP and processed into digital audio for transmission to the network via the BB. While the aforementioned link between the AP and BB is bidirectional (e.g., between two or more transceivers), the described techniques are equally applicable to unidirectional links (e.g., where only a transmitter transmits signals to a receiver).

During an exemplary transmission, a digital audio transmitter transmits pulse code modulated (PCM) data via an Integrated Inter-IC Sound Bus (I2S) serial bus interface to a digital audio receiver, via an underlying IPC link tunnel. The digital audio data is encapsulated within the payload portion of an IPC link data packet. In one such variant, the IPC data packets encapsulate I2S digital audio data words. Advantageously, the digital audio transmitter and receiver can communicate without altering legacy I2S software. In other variants, the digital audio transmitter and receiver may directly communicate PCM audio data within the IPC link data packets. Still other variants may tunnel raw audio data formats (e.g., pulse code modulated (PCM) data, linear PCM (LPCM), pulse density modulated (PDM) data, pulse width modulated (PWM) data, and/or other modulation formats.)

At step 604 of the method 600, responsive to a time sensitive hybrid processor transaction, the first processor determines a time reference of the second processor.

As used herein, a "time sensitive transaction" is a transaction that must be performed within a time constraint.

Common time constrained transactions may be performed with one or more of the following requirements: synchronous data transfer, isochronous data transfer, asynchronous data transfer, with a maximum/minimum latency, with a minimum/maximum throughput. Common examples of time sensitive protocols include without limitation e.g., real-time protocol (RTP) protocols, streaming applications, audio transactions, visual transactions, human interface applications.

As used herein, a "hybrid processor transaction" is an operation that requires interlocking or cooperating functions of multiple independently operable processors. Common examples of processor functionalities may include without limitation e.g., network communication, media processing, memory management, power management, encryption/decryption, security management, digital rights management, human interface (e.g., audio, visual, tactile interfaces).

While the exemplary embodiments described above are directed to voice applications and digital audio running on an application processor (AP) and baseband (BB), artisans of ordinary skill will readily appreciate the plethora of use cases which involve both time sensitive transactions and hybrid processor transactions. For example, online gaming and streaming video may be managed by an AP in conjunction with a BB for connectivity. Another common example is location-based tracking applications which are executed by the AP, but which rely on Global Positioning System (GPS) demodulation performed by the BB and/or accelerometers, altimeters, etc. Still other common applications include security, biometrics, and/or user authentication, fitness tracking and/or "wearable" type applications, virtual and augmented reality type applications, etc.

As a brief aside, a "transaction" refers to any unilateral and/or bilateral communication between two or more logical entities. Logical entities may be disposed at a single processor, virtualized within a hybrid processor, and/or located at a remote entity (e.g., a cloud based logical entity).

As used herein, a "time reference" broadly refers to any temporal scheme or identifier useful for ordering a sequence of events in time. In one exemplary embodiment, a reference event or series of events which mark the passage of a processor's experienced time is used as a time reference. For instance, a processor can signal the wrap event for a circular buffer of a predetermined size, depleted at a predetermined rate for playback. In one such embodiment, the predetermined size and predetermined rate of the circular buffer is based on application requirements; for example, applications that must tolerate sporadic connectivity interruptions may have larger buffers to smooth out the interruptions. Similarly, applications that have strict latency requirements may have shorter buffers to minimize delay between when data enters the buffer and when data is played. In other implementations, the buffer size and/or rate of depletion may be dynamically adjusted based on e.g., network congestion, available bandwidth, processor load, memory usage, power consumption, etc.

While the aforementioned embodiment is based on circular or ring buffers, artisans of ordinary skill in the related arts will readily appreciate, given the contents of the present disclosure, that a number of other data structures may be substituted with equivalent success. Suitable examples of alternative data structures include, without limitation, first-in-first-out (FIFO), last-in-first-out (LIFO), ping-pong, linked lists, and/or any number of other memory structures.

Moreover, while the aforementioned embodiment describes buffer wrap events (e.g., where a circular buffer "wraps" from its last entry to its first entry), it is appreciated that other buffer types may have different measures of buffer depletions. For example, in a fixed buffer and fixed depletion implementation, the transmit buffer should be depleted for bus transfers at the same rate as the receive buffer is depleted for voice playback. Consequently, differences in buffer depletion may correspond to an inferred difference in processor time. More directly, in embodiments that use FIFO type buffers, a difference in transmit and receive buffer depth could be used to determine rate mismatch. Similarly, for ping-pong embodiments (e.g., where a first memory bank fills while a second transfers, and then the second memory bank transfers while the first is filled), a difference in switching rates will correspond to a rate mismatch. Still other methods and techniques for measuring a rate of depletion and/or accommodating dynamically changing buffer depths and/or data rates are readily obvious to artisans of ordinary skill in the related arts, given the contents of the present disclosure.

Additionally, it is appreciated that certain "buffer wrap" events may not accurately reflect the passage of processor time. For example, a subscriber device that successfully transfers between base stations during handover may adjust its network time reference for its baseband processor (BB), but need not adjust the AP time reference. However, since the BB buffer may have skipped or repeated some amount of audio data, the buffer wrap event will not be an accurate reflection of the actual playback time associated with its samples. Consequently, in one exemplary embodiment, a processor may "pro-rate" or otherwise apportion a correction to the determined time reference. In one such variant, a wrap event for a circular buffer of a predetermined size, depleted at a predetermined rate for playback, is corrected for the amount of duplicated or skipped sample time. For example, a 300 ms digital audio buffer that has a duplicated 10 ms of audio data only has a playback time of 290 ms. Similarly, if 10 ms of audio is skipped, then the 300 ms digital audio buffer represents 310 ms of audio playback time (of which 10 ms is padded data).

The aforementioned discussion has primarily described rate of buffer wrap as a measure of time passage, however those of ordinary skill will readily appreciate that the various principles of the present disclosure may be readily extended to encompass other forms of time references. Other examples of time references include, without limitation, synchronization messages, time slots, time frames, interrupts, markers, explicit messaging, and or any number of other timing techniques. More generally, any task which must be performed with temporal consistency between the two or more processors may be used to infer a difference in processor time.

At operation 606 of the method 600, the first processor adjusts the time sensitive hybrid processor transaction for the time reference of the second processor. In some embodiments, the first processor adjusts its time reference to correspond to the time reference of the second processor or otherwise causes the second processor to adjust its time reference to correspond to the time reference of the first processor.

In some cases, the adjustment of a time reference includes, for example, synchronizing a time reference of a first processor with the time reference of the second processor. In some variants, the synchronizing of time reference includes increasing or decreasing a clock speed of the first processor. Synchronizing of a time reference may include dividing and/or multiplying one or more clock cycles of the first processor. In still other variants, the synchronizing of a time reference includes rewriting, incrementing, or decrementing a time value of the first processor. Other common examples of time reference synchronization include without limitation e.g., speeding up/slowing down the time reference, pulse swallowing/insertion, clock resetting, etc. Moreover, analog clock synchronization can be readily achieved with e.g., feedback loops for a phase locked loop (PLL), analog PLL (APLL), digital PLL (DPLL), delay locked loop (DLL), etc. Still other methods for adjusting a time reference will be readily appreciated by those of ordinary skill in the related arts, given the contents of the present disclosure.

In some cases, the adjustment of a time reference includes, for example, converting a time reference of a first processor to the time reference of a second processor. Common examples of timestamp conversion techniques include without limitation e.g., skipping ahead, lagging behind, duplication of time stamps, removal of time stamps, and/or any other number of translation between timing events (e.g., timestamps).

In one exemplary embodiment, the adjustment of the time reference includes a combination of different adjustment schemes with different degrees of granularity and responsiveness. For example, during normal operation, a processor may only make minor fine grain adjustments because the first and second processor will experience limited variance in time references due to e.g., differences in manufacturing tolerances, temperature, etc. However, certain tasks may require correction that exceeds the fine adjustment capability. For example, a cellular phone that experiences handover may have radical changes in time reference (different base stations may have different time references). Similarly, intermittent service outages or other prolonged periods of clock drift without correction could result in a discontinuous "step" change. More precisely, discontinuous "step" changes are due to changes to the clock signals' relative phase, in contrast, clock drift can be thought of as small differences in their relative frequencies.

Such large "step" changes can be accommodated with a coarse adjustment scheme, such as by rewriting, incrementing, or decrementing a time value. Artisans of ordinary skill in the related arts will readily appreciate that coarser adjustment methods can provide faster adaptation to the much larger differences in time reference, however they may distort the audio signal in a manner that severely affects the user experience, computationally expensive, and/or lack the granularity of control that fine adjustment allows for. Moreover, while a two-tiered fine/coarse scheme is described, a multi-level scheme with additional degrees of fineness or coarseness may be substituted with equal success, the foregoing being purely illustrative.

Referring back to step 606, in some embodiments, the first processor adjusts the time sensitive hybrid processor transaction to compensate for the time reference of the second processor, or otherwise causes the second processor to adjust the time sensitive hybrid processor transaction to compensate to the time reference of the first processor. For example, adjustment of the time sensitive hybrid processor transaction may include a manipulation of the processor transaction itself. More generally, compensation may include any number of techniques used to ameliorate the decrease in performance attributable to the difference in time reference between the processors.

As a brief aside, raw audio data (e.g., pulse code modulated (PCM)) is not checked by the processor for "validity". More directly, raw audio processing is unable to discern whether the data corresponds to e.g., a human voice or other intelligible audio. Thus, memory corruptions due to e.g., overflow and underflow conditions can result in highly undesirable audio artifacts that detract from the user experience. To these ends, in one exemplary embodiment, time sensitive hybrid processor transactions may be padded with null data or audio data that has a less-obtrusive effect when perceived. For example, rather than using stale PCM data during a memory overflow condition, the application processor (AP) or baseband (BB) may pad the PCM data with "silence" data (null data). In other examples, the processors may pad the PCM data with "white noise" or "comfort noise" data. In another example, the processors may simply re-use duplicative PCM data packets. More generally, any gap interpolation/concealment technique may be used with equivalent success by those of ordinary skill in the related arts; commonly used techniques include zero insertion, waveform substitution, filtering, and/or other model based methods common to the voice coding arts.

Similarly, the processor may outpace the rate of the consumption. For example, an AP with a relatively small audio buffer may generate data faster than the BB can transmit it. In another case, the BB processor may successfully execute a handover but due to timing differences between base stations, has an excessive amount of buffered audio data. Excessive data may also result in the aforementioned undesirable buffer overruns; consequently, such scenarios may require that one or more transactions are deleted or abridged.

Generally, a few deletions or abridged audio packets are minimally intrusive to the listener because the non-deleted audio data is intelligible raw audio; however, where the deletions span several packets, the audio may need to be mixed, faded in, filtered, or otherwise retimed so as to minimize human perceptible audio artifacts. For example, the gap caused by removing PCM data from a sequence of raw PCM data may be digitally smoothed with a filter. For longer gaps, one PCM sample may be faded while the other is amplified, so as to mix the two samples together. Moreover, while the foregoing discussion is primarily focused on audio data, artisans of ordinary skill will appreciate that other forms of media and data may be similarly modified including e.g., video data, image data, game data, location data, and/or metadata. For example, streaming video for a teleconference may be reduced in resolution, filtered, smoothed, or scaled to compensate for packet loss due to e.g., a handover between base stations.

At operation 608 of the method 600, the adjusted time sensitive hybrid processor transaction is provided to the second processor, and the second processor performs the adjusted time sensitive hybrid processor transaction (step 610).

In some embodiments, the first processor further provides the second processor with an indication of an adjustment to the first processor's time reference and/or an amount to adjust the second processor's time reference. For example, an application processor (AP) transmits pulse code modulated (PCM) audio data that has been corrected for the baseband processor (BB) time reference (which is also the base station time reference). The BB transmits the corrected PCM data, which is padded with PCM data or punctured for appropriate playback by e.g., another subscriber device.

While PCM digital audio does not have out-of-band communications, it is appreciated that other time sensitive hybrid processor transactions formats may enable out-of-band signaling (or in-band signaling) for identifying invalid data and appropriate compensation. For example, other digital audio links may be able to identify invalid audio data, thereby allowing the recipient to select the appropriate method for compensation e.g., padding and/or deletion.

More generally, an out-of-band signaling (or in-band signaling) technique may enable the processors to negotiate and/or postpone data delivery or reception. Certain interprocessor systems may encounter problems where a packet is received too far in advance of its expected sequence. Accordingly, such embodiments may restrict excessively early transmissions by e.g., discarding future timestamped packets and/or rewriting the future timestamps. Still other out-of-band signaling techniques may enable efficient bus management by e.g., selectively queuing, padding, and/or skipping packets so as to smooth out "step" changes in timing reference.

While the foregoing discussion is directed to transactions between processors, it is readily appreciated by those of ordinary skill in the related arts that the various principles described herein may readily be adapted to individual processor functionality and/or functionality between the processor(s) and other peripherals. In some implementations, a processor may additionally need to adjust the clock, power, data transfer mode, and/or other operations for a peripheral. For instance, a processor may need to adjust the clock rate for a speaker and/or microphone. In another such instance, a processor may need to adjust a power mode or state machine, for example to prevent sleep mode so as to minimize clock drift between processors and/or to more frequently enter sleep mode (e.g., to save power).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for transmitting time sensitive data over a tunneled bus interface, comprising:
   operating a first processor apparatus independently of a second processor apparatus, where the first processor apparatus operates with a first time reference and the second processor apparatus operates with a second time reference;
   responsive to a time sensitive hybrid processor transaction:
      determining the second time reference for the second processor apparatus;
      adjusting the time sensitive hybrid processor transaction to compensate for a clock difference between the first time reference and the second time reference; and
      providing the adjusted time sensitive hybrid processor transaction to the second processor apparatus from the first processor apparatus via the tunneled bus interface.

2. The method of claim 1, wherein the time sensitive hybrid processor transaction comprises transacting a pulse code modulated (PCM) digital audio signal; and
   the adjusting of the time sensitive hybrid processor transaction comprises adjusting the PCM digital audio signal for transmission by the second processor apparatus to a cellular network.

3. The method of claim 2, wherein the adjusting of the PCM digital audio signal comprises adding null PCM digital audio data.

4. The method of claim 2, wherein the adjusting of the PCM digital audio signal comprises deleting a portion of the PCM digital audio signal.

5. The method of claim 1, wherein the determining of the time reference for the second processor apparatus comprises receiving a wrap event of a circular buffer of audio data; and
   comparing the wrap event to an audio playback time associated with the circular buffer of audio data.

6. The method of claim 5, wherein the time sensitive hybrid processor transaction comprises transacting a pulse code modulated (PCM) digital audio signal generated from one or more audio packets received from a cellular network.

7. The method of claim 6, further comprising calculating a difference in one or more timestamps associated with the one or more audio packets when a handover event occurs.

8. The method of claim 7, further comprising calculating a corrected audio playback time associated with the PCM digital audio signal generated from the one or more audio packets associated with the handover event.

9. The method of claim 8, further comprising pro-rating the determined second time reference by the corrected audio playback time.

10. A user equipment (UE) apparatus, comprising:
    an application processor apparatus coupled to a baseband processor apparatus;
    the application processor apparatus comprising a circular buffer configured to transact pulse code modulated (PCM) digital audio data with the baseband processor apparatus via a tunneled bus interface;
    where the baseband processor apparatus is configured to transact audio packets with a cellular network based on the PCM digital audio data; and
    a non-transitory computer readable medium comprising one or more instructions which when executed by the application processor apparatus cause the application processor apparatus to:
       determine a first time reference for the baseband processor apparatus;
       determine a clock drift between the first time reference and a second time reference of the application processor apparatus; and
       adjust the PCM digital audio data to compensate for the clock drift.

11. The UE apparatus of claim 10, wherein the circular buffer comprises:
    an uplink buffer configured to store PCM digital audio data for transmission to the baseband processor apparatus; and
    a downlink buffer configured to store PCM digital audio data received from the baseband processor apparatus.

12. The UE apparatus of claim 10, wherein the circular buffer is further configured to generate a buffer wrap event; and wherein the determination of the first time reference is based on the generated buffer wrap event.

13. The UE apparatus of claim 10, wherein the baseband processor apparatus is further configured to generate a buffer wrap event; and wherein the determination of the first time reference is based on the generated buffer wrap event.

14. The UE apparatus of claim 10, further comprising one or more instructions which when executed by the application processor apparatus cause the application processor apparatus to playback the adjusted PCM digital audio data.

15. The UE apparatus of claim 10, further comprising one or more instructions which when executed by the application processor apparatus cause the application processor apparatus to provide the adjusted PCM digital audio data to the baseband processor apparatus.

16. A user equipment (UE) apparatus, comprising:

an application processor apparatus coupled to a baseband processor apparatus;

the application processor apparatus comprising a circular buffer configured to transact pulse code modulated (PCM) digital audio data with the baseband processor apparatus via a tunneled bus interface;

where the baseband processor apparatus is configured to transact audio packets with a cellular network based on the PCM digital audio data; and a non-transitory computer readable medium comprising one or more instructions which when executed by the baseband processor apparatus cause the baseband processor apparatus to:

determine a first time reference for the application processor apparatus;

determine a clock drift between the first time reference and a second time reference of the baseband processor apparatus; and adjust the audio packets to compensate for the clock drift.

17. The UE apparatus of claim 16, wherein the circular buffer is configured to transact PCM digital audio data with the baseband processor apparatus without the application processor apparatus control.

18. The UE apparatus of claim 16, further comprising one or more instructions which when executed by the baseband processor apparatus cause the baseband processor apparatus to transmit the adjusted audio packets to the cellular network.

19. The UE apparatus of claim 16, further comprising one or more instructions which when executed by the baseband processor apparatus cause the baseband processor apparatus to notify the application processor apparatus of a handover event.

20. The UE apparatus of claim 19, wherein the adjusted audio packets are pro-rated according to the determined clock drift attributed to the handover event.

* * * * *

UNITED STATES PATENT AND TRADEMARK OFFICE
CERTIFICATE OF CORRECTION

PATENT NO. : 10,346,226 B2
APPLICATION NO. : 15/720603
DATED : July 9, 2019
INVENTOR(S) : Jason McElrath et al.

Page 1 of 1

It is certified that error appears in the above-identified patent and that said Letters Patent is hereby corrected as shown below:

On the Title Page

Item (73) Should Read:
--(73) Assignee: Apple Inc.,
Cupertino, CA (US)--

Signed and Sealed this
Seventeenth Day of March, 2020

Andrei Iancu
*Director of the United States Patent and Trademark Office*